United States Patent [19]

Richardson

[11] Patent Number: 5,699,487

[45] Date of Patent: Dec. 16, 1997

[54] ARTIFICIAL NEURAL NETWORK READ CHANNEL

[75] Inventor: Kenneth G. Richardson, Fort Collins, Colo.

[73] Assignee: Hewlett-Packard Company, Palo Alto, Calif.

[21] Appl. No.: 499,152

[22] Filed: Jul. 7, 1995

[51] Int. Cl.$^6$ .............................. G06E 1/00; G06F 15/18
[52] U.S. Cl. ............................. 395/22; 395/23; 395/24
[58] Field of Search ......................... 360/46; 395/20–25, 395/27; 382/155–159

[56] References Cited

U.S. PATENT DOCUMENTS

| | | | |
|---|---|---|---|
| 5,151,970 | 9/1992 | Engeler | 395/24 |
| 5,247,605 | 9/1993 | Engeler | 395/24 |
| 5,594,597 | 1/1997 | Padden | 360/46 |

FOREIGN PATENT DOCUMENTS

| | | | |
|---|---|---|---|
| 0454445 | 10/1991 | European Pat. Off. | 25/3 |
| 0498574 | 8/1992 | European Pat. Off. | 20/22 |

OTHER PUBLICATIONS

1994 IEEE Globecom. Communications: The Global Bridge. "Artificial Neural Networks For Smart Detection Of Digitally Modulated Signals", pp. 1029–1033, vol. 2 by Horst J. Bessai and Werner Lorek.

Sixth Joint Magnetsim and Magnetic Materials, vol. 30, No. 6, pt. 1, ISSN 0018–9464, IEEE Transactions On Magnetics, Nov. 1994, USA, pp. 4221–4223, "Improved Equalization For Digital Recording Using Nonlinear Filtering And Error Confinement", by Nair, et al.

Patent Abstracts of Japan, vol. 017, No. 384 (p–1575), 19 Jul. 1993 JP–A–05 062365 (Fujitsu Ltd), 12 Mar. 1993.

Patent Abstracts Of Japan, vol.018, No.121 (P–1700), 25 Feb. 1994, JP–A–05 307622 (Victor Co of Japan Ltd), 19 Nov. 1993.

Nair, S.K. and Moon, J., "Improved Equalization for Digital Recording Using Nonlinear Filtering and Error Confinement," IEEE Transactions on Magnetics, vol. 30, No. 6 (Nov. 1994), pp. 4221–4223.

Borisyuk, "A model of the neural network for storage and retrieval of temporal sequences"; Neuroinormatics and Neurocomputers, 1992 RNNS/IEEE Symposium, vol. 2, pp. 865–869, Oct. 1992.

Lee, "Neural net equalization for a magnetic recording channel"; Conference Record of the twenty–seventh Asilomar Conference on signals, systems and computers, pp. 369–374 vol. 1, Nov. 1993.

Nair et al, "Improved equalization for digital recording using nonlinear filtering and error confinement"; IEEE Transactions on Magnetics, vol. 30 Iss. 6, pt. 1 pp. 4221–4223, Nov. 1994.

*Primary Examiner*—Tariq R. Hafiz

[57] ABSTRACT

A magnetic read channel employs an artificial neural network for reconstruction of a recorded magnetic signal and its corresponding synchronization signal. A magnetic read head receives magnetic signals from a magnetic recording media such as a magnetic tape or disk and converts it to an electronic signal. A preamplifier receives and amplifies the electronic signal from the magnetic read head to produce an amplified electronic signal. A delay line receives the amplified electronic signal from the preamplifier, storing delayed successive representations of the received signal. An artificial neural network receives the delayed successive representations from the delay line for reconstruction of the originally recorded data signal. Prior to use in an application, the artificial neural network is trained via a training method with a known training set of corresponding simultaneously generated data and clock pairs. Training the network with data having such known clock (synchronization) signal enables extraction of the synchronization signal from its nonlinear properties hidden within its corresponding data.

10 Claims, 8 Drawing Sheets

STEP 4
BACKPROPAGATION

CALCULATE LEARNING TERMS $\Gamma_K^{(n)}$:

$\Gamma_K^{(n)} \equiv$ LEARNING TERM

3rd OUTPUT LAYER:
$$\Gamma_{K(p)}^{(3)} = e_K^{(3)} (1-O_K^{(3)}(p))(O_K^{(3)}(p))$$

2nd HIDDEN LAYER:
$$\Gamma_\ell^{(2)}(p) = \left[\sum w_{K\ell}^{(3)}(p) \Gamma_K^{(3)}(p)\right] (1-O_\ell^{(2)}(p))(O_\ell^{(2)}(p))$$

1st INPUT LAYER:
$$\Gamma_i^{(1)}(p) = \left[\sum w_{\ell i}^{(2)}(p) \Gamma_\ell^{(2)}(p)\right] (1-O_i^{(1)}(p))(O_i^{(1)}(p))$$

UPDATE WEIGHTS:

3rd OUTPUT LAYER:
$$w_{K\ell}^{(3)}(p+1) = w_{K\ell}^{(3)}(p) + \mu^{(3)} \Gamma_K^{(3)}(p) O_\ell^{(2)}(p)$$

2nd HIDDEN LAYER:
$$w_{\ell i}^{(3)}(p+1) = w_{\ell i}^{(2)}(p) + \mu^{(2)} \Gamma_\ell^{(2)}(p) O_i^{(1)}(p)$$

1st INPUT LAYER:
$$w_{ij}^{(1)}(p+1) = w_{ij}^{(1)}(p) + \mu^{(1)} \Gamma_i^{(1)}(p) X_j(p)$$

524

IS $p < P$? — YES → $P = p+1$

NO

IS $\epsilon_K(p) < e_{max}$ or $E_p < \epsilon_{max}$? — NO → $p = 1$

STOP

FIG. 7B

ARTIFICIAL NEURAL NETWORK READ CHANNEL

FIELD OF THE INVENTION

The present invention is directed to read channels used in magnetic recording technology, and more particularly to an artificial neural network read channel for performing detection, filtering, equalization, and clock recovery reconstruction of a signal from magnetic media.

BACKGROUND OF THE INVENTION

In the field of magnetic recording technology, various methods exist for recovering recorded information from the magnetic media. A typical read channel for a magnetic recording system comprises an electromagnetic read/write head having means for detecting the magnetic fields stored by the particles on the magnetic media and for converting the received electromagnetic signals to electronic signals. A preamplifier then receives the electronic signal from the electromagnetic read/write head, which is typically in the mV range, and amplifies it typically to the hundreds of mV range. A filter/equalizer receives the amplified signal from the preamplifier to equalize the channel response and filter out unwanted noise. In a peak detecting channel, the output from the equalizer is level qualified and peak detected yielding a digital pulse train which is phase locked and then decoded.

In a typical device, digital data is recorded via modulation codes (e.g., on-off, polar, or bipolar codes). Modulation codes are characterized by, among other properties, adequate timing content, intersymbol interference (ISI), error detection and correction capability, favorable power spectral density, and transparency (yielding correct data transmission regardless of pattern of 0's and 1's). The modulation code used in magnetic read channels for magnetic recording systems is typically based on a bipolar signal, which utilized the nonlinear magnetic characteristics of the media.

In order to increase the bit density and thus the memory capacity of a magnetic storage device, more efficient modulation codes have been developed. Generally, however, the more efficient the modulation code, the more difficult it is to extract timing information, which makes the overall detection problem more difficult.

An alternative way of viewing the signal processing problem is to recognize that there exist a finite number of possible expected data values (or patterns) recorded on the media. The problem may then be treated as a pattern recognition, or classification, problem. In other areas of science, such as chromatography, speech recognition, image recovery, and other spectral processing applications, methods have been developed for use in pattern recognition. One such method is to employ an artificial neural network.

An artificial neural network, also called a neural net, is a dense interconnection of simple computational elements operating in parallel and connected by links of variable weights to solve a problem and to achieve high performance pattern recognition. Neural nets are known to be generally noise immune (especially when trained with noisy data), capable of a certain amount of generalization, and capable of deductively handling perturbations in the data to correctly classify the data. In the artificial neural network, each computational element, also called a node or neuron, receives a number of weighted inputs, performs a summation of the inputs, and passes the output of the summer through a non-linearity (and possibly a bias for limiting the output swing). The neurons are typically arranged in layers and are interconnected by a set of weights associated with each summer.

The use of a neural network typically involves a learning process and a generalization process, or application. During the learning process, a training algorithm adjusts the weights of the neurons to produce a trained network, whereby it correctly responds to as many randomly preselected patterns as possible in a training set containing the desired responses. Once the network has been trained, having adjusted the neuron weights to produce the desired output response from the input training set, the neural net may be tested by applying input patterns which were not included in the training set. If the trained network correctly responds with high probability to the applied input test patterns, the neural network has been generalized, and is ready for application. Thus, in the present invention, the neural network would typically be trained, generalized, and installed in the application device during the manufacturing process.

The artificial neural network approach also allows circumvention of timing extraction issues. Utilizing the non-linear relationships in the signal itself as the training reference, the neural net can provide a "trained" timing response to the input data from which the synchronization signal may be derived.

A neural network is employed in the magnetic read channel of the present invention to reconstruct (or "classify") a recorded magnetic signal and to extract the synchronization signal from the data itself. The use of neural networks in a magnetic read channel has the advantage of adaptability because neural networks can have the capability of training new or altered input.

SUMMARY OF THE INVENTION

In view of the foregoing problems and technological advances encountered in the art, it is a principal object of this invention to provide a read channel for magnetic recording technology using an artificial neural network to perform the equivalent of filtering, equalization, reconstruction, and detection of a magnetic signal.

It is another object of this invention to reconstruct a synchronization signal from the data signal itself.

It is yet another object of this invention to eliminate the filter, equalizer and detector of standard read channels.

It is yet another object of this invention to provide a robust method of data recovery for a read channel in a magnetic recording system which allows data to be more densely packed on the media, and at the same time requires less error recovery information to be stored to the media, thus providing more efficient media capacity.

These and other objects of this invention are accomplished by an artificial neural network read channel for use in a magnetic recording system.

The invention as described herein may comprise a magnetic read channel having an artificial neural network performing the equivalent of filtering, equalization, reconstruction, and detection of a magnetic signal received from a magnetic read head. A magnetic read head receives magnetic signals from a magnetic recording media such as a magnetic tape or disk and converts it to an electronic signal. A preamplifier receives and amplifies the electronic signal from the magnetic read head to produce an amplified electronic signal. A delay line receives the amplified electronic signal from the preamplifier and stores delayed successive representations of the amplified electronic signal. An artificial neural network receives the delayed successive representations of the signal from the delay line for reconstruction of the originally recorded data signal. In a preferred embodiment, a set of first layer artificial neurons each receives the stored delayed representations of the amplified electronic signal from the delay line, performs a weighted summation of the delayed representations, and passes the sum through a non-linearity to produce first input layer output signals. A set of second hidden layer artificial neurons each receives the first layer output signals as input, performs a weighted summation of the inputs, and passes the sum through a non-linearity to produce second hidden layer output signals. A set of third output layer artificial neurons each receives the second layer output signals as input, performs a weighted summation of the inputs, and passes the sum through a non-linearity to produce both the reconstructed data signal and the reconstructed synchronization signal from the signal originally recorded on the magnetic media. Reconstruction is accomplished via a prior conducted training process which utilizes a training set of known data and clock pairs to determine the optimum neuron weight set values for proper reconstruction (or classification) of both the data and synchronization signals.

BRIEF DESCRIPTION OF THE DRAWINGS

An illustrative and presently preferred embodiment of the invention is shown in the accompanying drawings in which:

FIG. 7A and 7B illustrate the backpropagation algorithm used in the preferred embodiment.

DETAILED DESCRIPTION OF THE INVENTION

Figure 1:
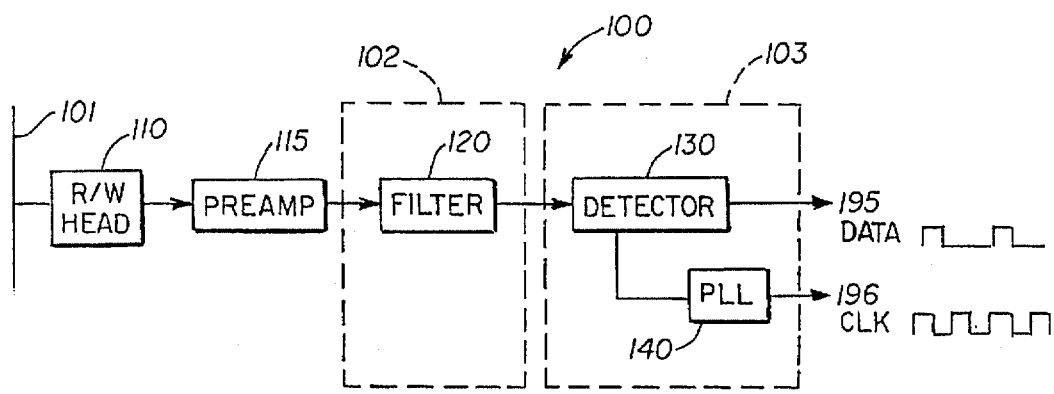
FIG. 1 is a block diagram of a traditional read channel for a magnetic recording device.

Turning now in detail to the description of the preferred embodiment, and with reference to the drawing, FIG. 1 shows a block diagram of a standard read channel for a magnetic recording device. Traditional read channels generally comprise three stages, including filter/equalization 102, detection 103, and reconstruction of the signal. A standard read channel 100, as FIG. 1 depicts, generally includes a magnetic read head 110 for receiving the magnetic signals from the magnetic recording media 101 and converting the magnetic signals to electronic signals. A preamplifier 115 typically receives the electronic signal from the magnetic read head 110 and amplifies the electronic signal to produce an amplified electronic signal with a signal-to-noise ratio suitable for input to a filter 120. A filter 120, typically a lowpass filter, receives the amplified electronic signal and removes undesirable noise from the signal. A detector 130 receives the filtered signal to derive the data from the analog read signal and restore it to a pulse stream. Usually, a phase locked loop 140 is used to synchronize the pulse stream and facilitate data recovery.

Figure 2:
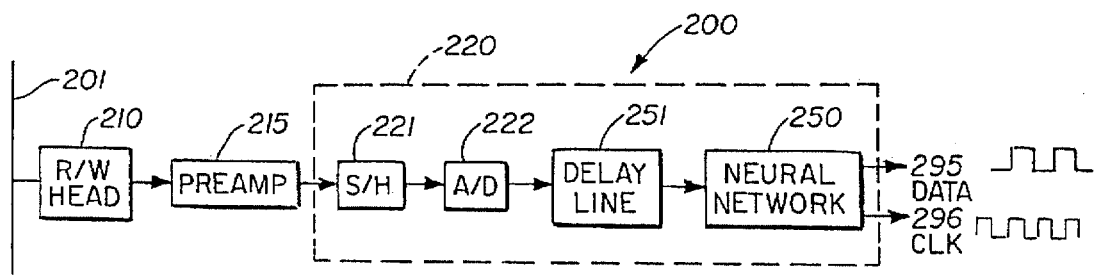
FIG. 2 is a block diagram of the read channel of the present invention.

FIG. 2 shows the block diagram of the read channel 200 of the present invention. As will be appreciated from FIG. 1 and 2, an artificial neural network stage 220 replaces the filter/equalization 102 and detection 103 stages of the traditional magnetic read channel. In the preferred embodiment, a magnetic read head 210 receives a magnetic signal from the magnetic recording media 201 and converts the magnetic signal to an electronic signal. A preamplifier 215 receives the electronic signal from the magnetic read head 210 and amplifies it to produce an amplified electronic signal having a level of suitable signal-to-noise ratio for input to subsequent circuitry. An artificial neural network stage 220 then receives the amplified electronic signal for equalization, detection and reconstruction of the original data signal recorded on the magnetic recording media 201 to produce a reconstructed data signal 295 and a reconstructed synchronization signal 296. Although the preferred embodiment depicted in FIG. 2 is implemented for use with digital data, it will be appreciated that the present invention is not limited to digital data implementations; rather, the output will be dependent on the implementation of the artificial neural network stage 220. Thus, if the neural network implementation is digital, the output will be discrete. If the neural network implementation is analog, the output will be continuous. The preferred embodiment, however, is constructed as a digital neural network for use with digital data.

In the digital implementation of the artificial neural network stage 220 of the preferred embodiment depicted in FIG. 2, a sample-and-hold circuit 221 samples the amplified electronic signal periodically, holding constant the level of the signal until the next sample, thereby quantizing the signal in preparation for analog-to-digital conversion. An analog-to-digital (A/D) converter 222 receives the quantized signal and converts it to a digital signal which is equivalent to the quantized analog input signal. A delay line 251 receives the converted digital signal from the A/D converter 222 for delaying and storing successive representations of the digital signal. A neural network 250 receives the delayed successive representations of the digital signal from the delay line 251 for reconstruction of the data signal 295 and the synchronization signal 296.

Figure 3:
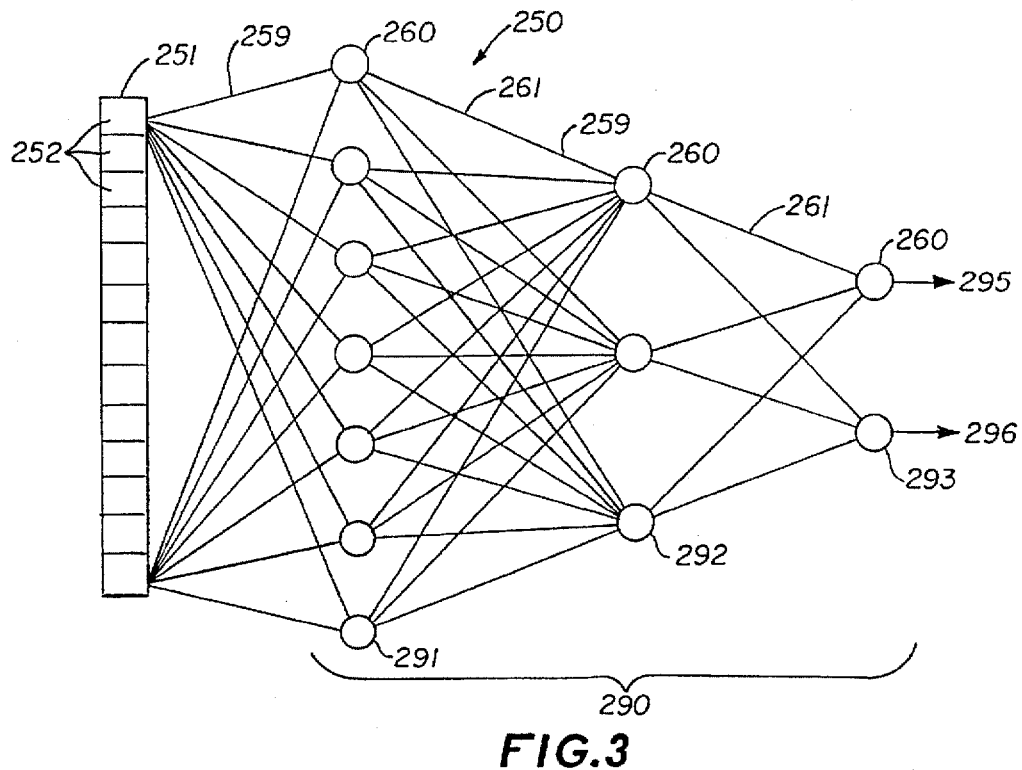
FIG. 3 is a block diagram of the 7-3-2 fully interconnected feedforward network topology used in the preferred embodiment of the artificial neural network for the present invention, with outputs including the reconstructed data signal and the recovered synchronization signal.

FIG. 3 depicts the delay line 251 and the neural network 250 of the preferred embodiment in greater detail. With reference to FIG. 3, the neural network 250 used in the preferred embodiment is implemented using a feedforward fully interconnected neural network topology having a 7-3-2 configuration 290. The delay line 251 delays and stores successive representations of the delayed signal in a series of delay line taps 252, wherein each delay line tap 252 contains one delayed representation of the input signal.

Figure 4:
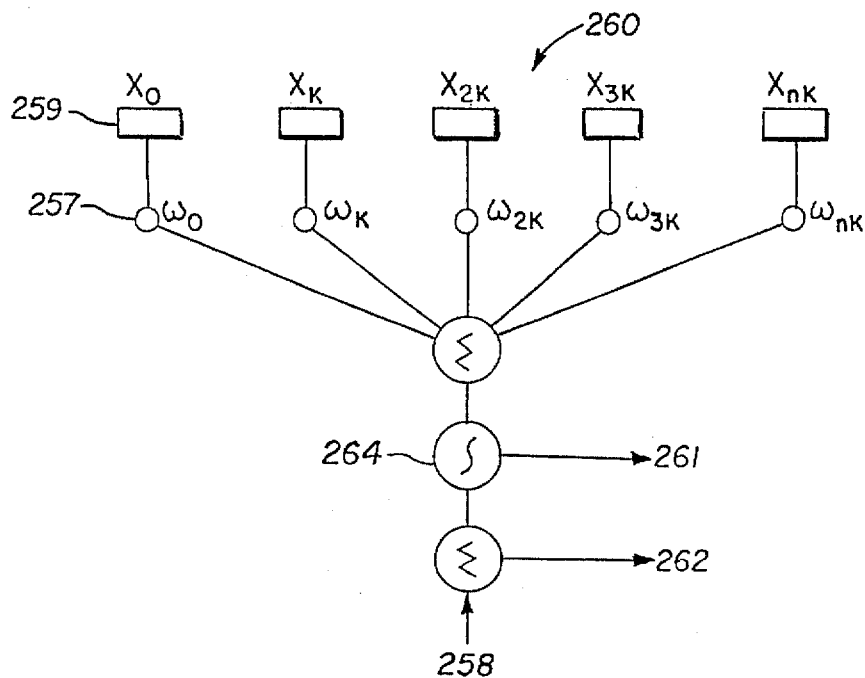
FIG. 4 depicts a typical adaptive artificial neuron, called a neuron, used as the basic building block in a neural network.

Each delay line tap 252 is directly coupled to each artificial neuron 260 in the first layer 291. Each artificial neuron 260 has the capability of receiving a plurality of inputs 259 and producing an output signal 261 which is a nonlinear weighted combination of its inputs 259. FIG. 4 depicts a typical artificial neuron 260 coupled with a non-linearity 264. For digital implementations, the artificial neuron 260 receives at presentation time k an input vector $X_k = [x_0, x_{1k}, \ldots x_{nk}]$ 259 having n received inputs, and possibly a desired response $d_k$ 258 for use in training the neural network 250. The artificial neuron 260 weights the inputs 259 with a set of coefficients via a weight vector $W_k = [w_{0k}, w_{1k}, \ldots w_{nk}]^T$ 257. The artificial neuron 260 computes the sum of the weighted inputs, passing it through a non-linearity, to produce an output signal $O_k = f(X_k^T W_k)$ 261.

As shown in FIG. 3, the network topology implemented in the preferred embodiment is a 7-3-2 feedforward configuration 290, comprising a first "input" layer 291 having seven neurons, a second "hidden" layer 292 having three neurons, and a third "output" layer 293 having two neurons. Additionally, as will be noted from FIG. 3, the neural network is fully interconnected, having each neuron in a given layer connected to every neuron in the subsequent layer. The output layer 293 produces a reconstructed data signal 295 and a reconstructed synchronization signal 296 (which is reconstructed directly from the input data itself).

Figure 5:
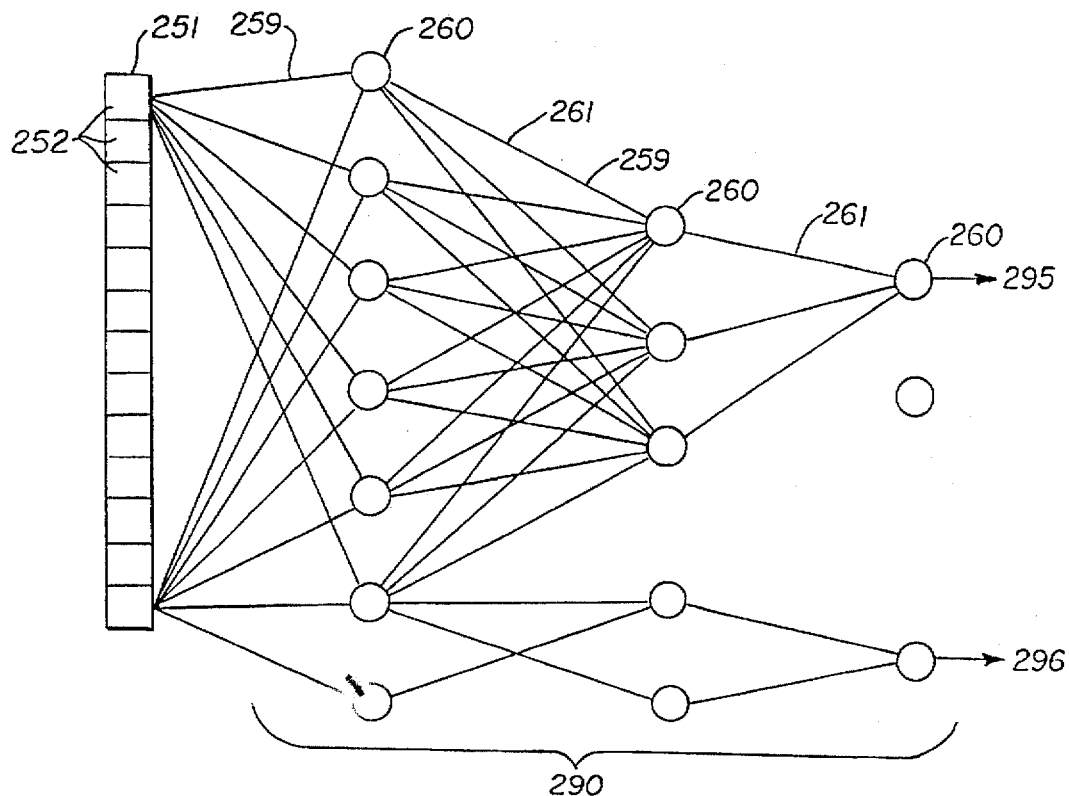
FIG. 5 depicts a preferred embodiment using a feedforward network topology and having reconstruction of the synchronization signal via a sparsely connected network.

An alternative preferred embodiment of the network topology is shown in FIG. 5. In this configuration, the reconstructed data signal 295 is derived from a feedforward neural network. However, as shown in FIG. 5, the synchronization output 296 is derived from a sparsely connected neural network.

Figure 6:
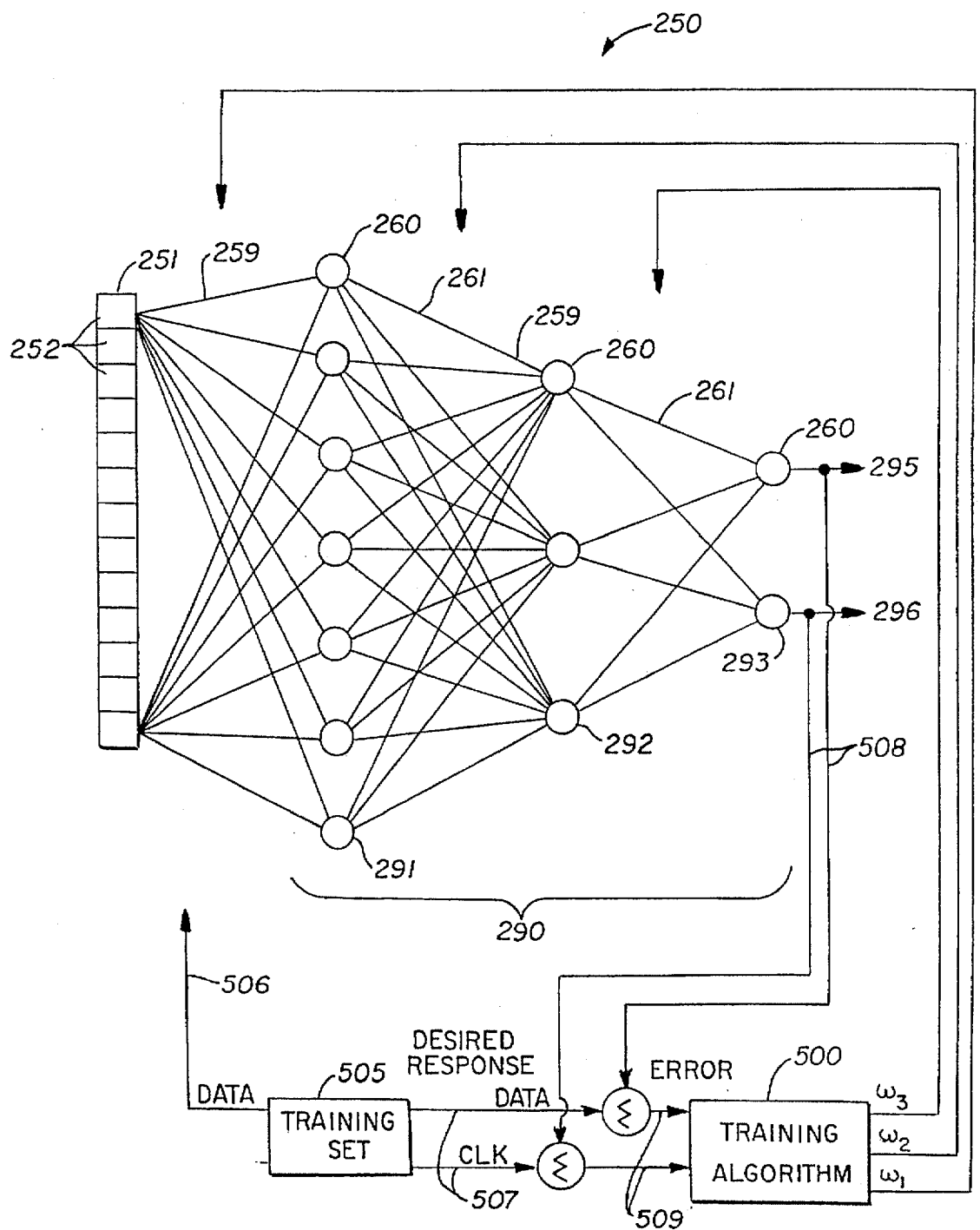
FIG. 6 is a block diagram depicting the application of the training algorithm to the artificial neural network as used during the training process.
Figure 11:
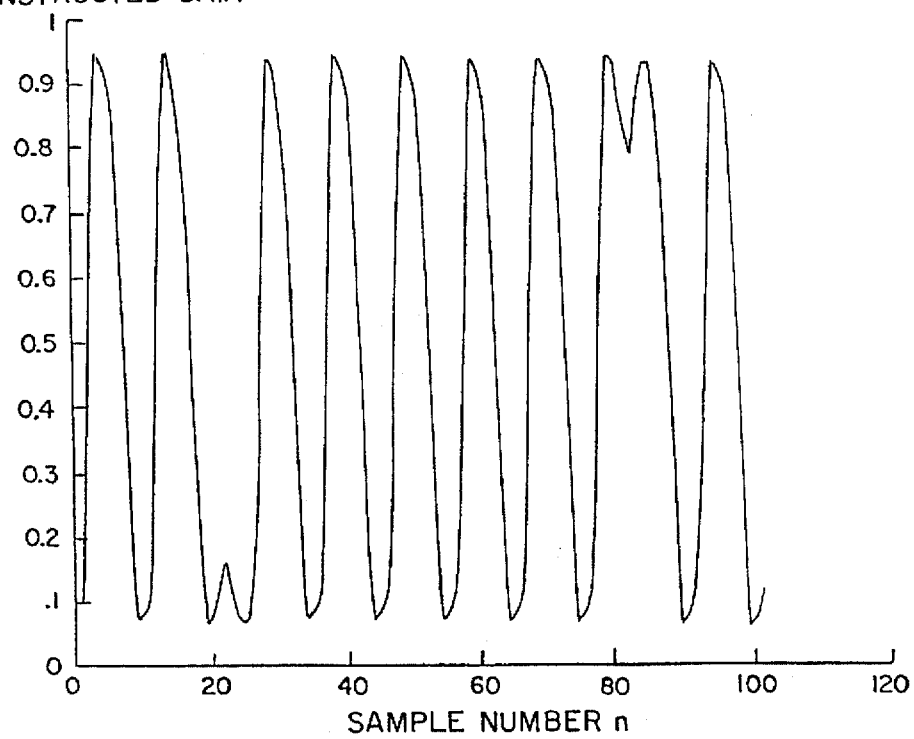
FIG. 11 is a plot of the reconstructed data per sample number n.
Figure 12:
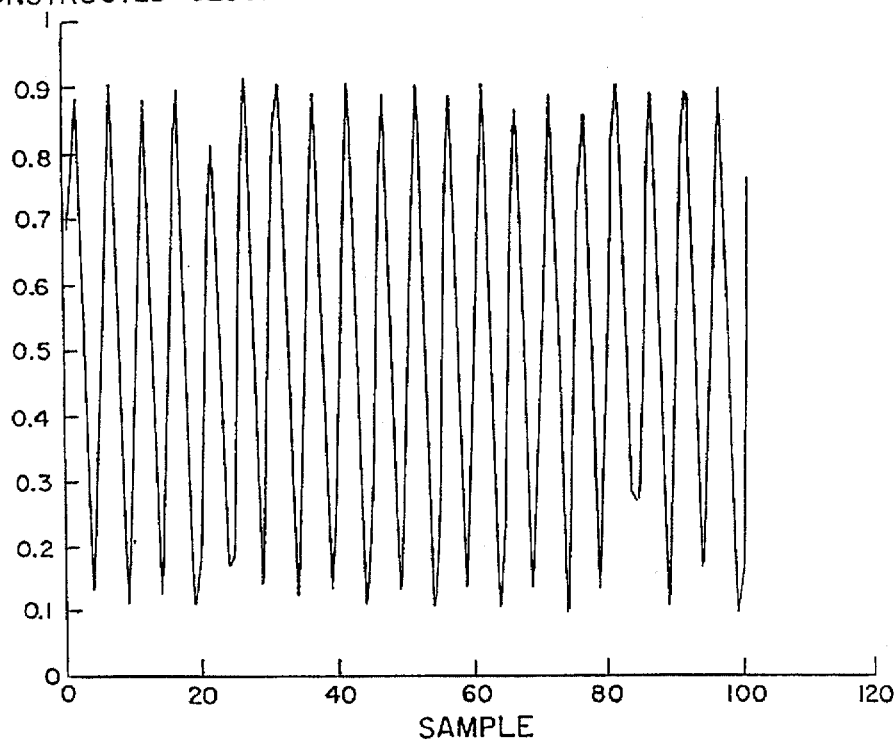
FIG. 12 is a plot of the reconstructed clock per sample number n.

Proper reconstruction of the data signal 295 and synchronization signal 296 requires training the neural network 250. FIG. 6 illustrates the application of the training algorithm 500 to the neural network 250. With reference to FIG. 6, a training set 505 is generated containing an input data signal 506 from the magnetic read head (shown in FIG. 10) and corresponding pairs of training data and clock (synchronization) signals 507 (shown in FIG. 8 and 9). The input data signal 506 of the training set 505 is used as the input to the neural network 250. Because of the type of code used, the input data signal 506 itself contains a representation of the clock signal. However, the clock signal is hidden within the data and may only be extracted through nonlinear means. The artificial neural network is ideal for solving the problem of extracting the hidden synchronization signal from the data signal because it can be trained using the nonlinear characteristics hidden in the data signal itself. Thus, the input data signal 506 is applied as the inputs 259 of the neurons 260 in the first layer 291. The input data signal 506 (FIG. 10) is propagated through the second layer 292 and third layer 293 to produce an output response pair 508, which, once the network is trained, also represents the reconstructed data signal 295 (FIG. 11) and the reconstructed synchronization signal 296 (FIG. 12). During the training process, however, the output response pair 508 is compared to the desired response pair 507 (FIG. 8 and 9) to produce an error signal 509. Utilizing the error signal 509, a training algorithm 500 accordingly adjusts the weights via the weight vector $W_k$ 257 for each artificial neuron 260 in the first layer 291 to minimize the error between the output response 508 and the desired response 507. The input training data is reapplied iteratively until the network converges, and the weight values are optimized.

Figure 7A:
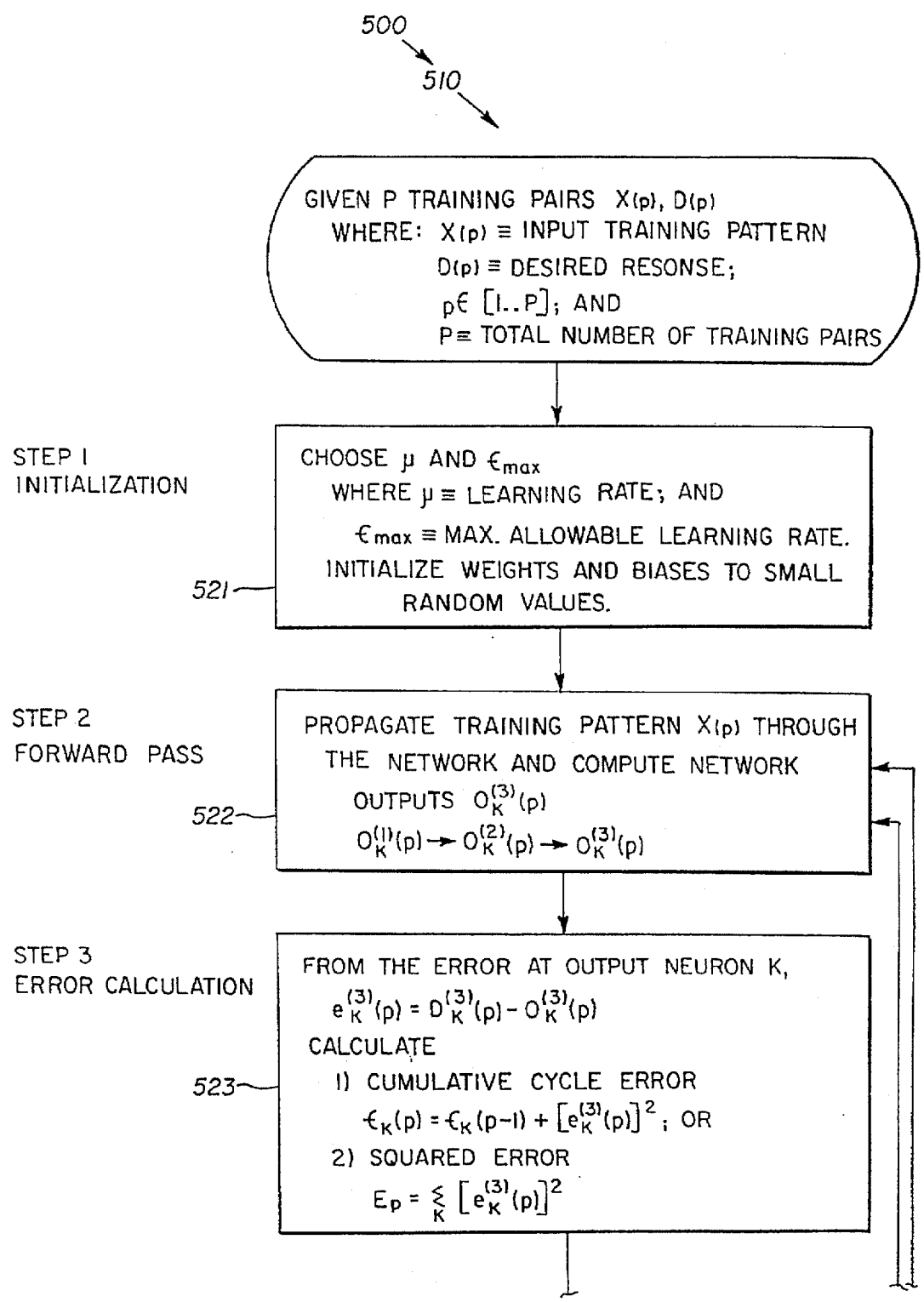

The preferred embodiment employs backpropagation 510 for the training method 500. The backpropagation training method 510 is an iterative gradient algorithm designed to minimize the mean square error between the actual output of a multilayer feed-forward neural network and the desired output. FIG. 7A and 7B illustrates the backpropagation algorithm 510 used in the preferred embodiment. Initially, as shown in FIG. 7A, initialization is performed in Step 1 521, wherein the weight vectors $W_k$ 257 for each artificial neuron 260 are set to small random values. A forward pass occurs in Step 2 522, wherein an input data signal 506, vector $X_k = X_0, X_1, \ldots, X_{k-1}$, is presented to the neural network 250 at the first layer 291 for propagation through the network to the output layer. Each first layer neuron receives the input data signal 506 (FIG. 10) at its inputs $X_k$ 259, weights the inputs 259 via the weight vector $W_k$ 257, performs a summation of its weighted inputs, and passes the sum through a non-linearity to produce an output signal 261. Each second layer neuron receives the output signals 261 from the first layer neurons as input 259, performs a weighted summation and passes the sum through a non-linearity to produce an output signal 261. Each third layer neuron receives the output signals 261 from the second layer neurons as input 259, performs a weighted summation and passes the sum through a non-linearity to produce an output response 508.

In Step 3 523, the error signal is calculated using the output response 508 and the desired response 507. Since the neural network 250 can only generate an output from 0 to 1, all desired response data is typically set between 0.1 and 0.9. The error signal is calculated by one of two methods, namely by either cumulative cycle error or by squared error.

In Step 4 524, depicted in FIG. 7B, the weight vectors $W_k$ 257 are adapted recursively, starting at the third output layer neurons 293 and working back to the first input layer neurons 291. The weights are adapted according to the backpropagation algorithm as given in Step 4 524 of FIG. 7B.

Steps 2 through 4 (522 through 524) of the backpropagation algorithm given in FIG. 7A and 7B are repeated until generalization occurs. Generalization occurs when the network output mean squared error for an epoch (one pass through a training set 505) is less than the training goal, $E_{max}$. At this point, the neural network 250 is trained, and may be tested using input test data.

Appendices A1–A9 depict the actual implementation of the preferred embodiment. The neural network 250 in the preferred embodiment employed the widely used commercially available interactive mathematical computation environment, MATLAB, produced by Mathworks, Inc., for implementing the feedforward 7-3-2 configuration neural network 290 and the backpropagation training algorithm 510. Appendix A1 is a sample control file for initializing the network topology, the learning rate for each layer, the number of iterations to perform in which convergence should occur, and a momentum value to speed up convergence. As seen from Appendix A1, with the variables r, s, and m representing the number of neurons in the first input layer 291, the second hidden layer 292, and the third output layer 293, respectively, the neural network topology of the preferred embodiment has a 7-3-2 configuration 290. The learning rates, represented by the variables u1, u2, and u3, are set to 0.1, 0.25, and 0.4 for the first, second and third layers, respectively. The momentum, which affects the learning process, is set to 0.95.

The implementation for generating the training set 505 including the corresponding pairs of desired responses 507, and the input data vectors X_n 506, is depicted in Appendix A2. In this implementation, the training set 505, D_n_set, contains a set of corresponding data and clock signals.

During training, a random subset of the training set 505 is selected. There are 50 vector pairs selected for each training session, comprising an input vector [25×1] and an output vector [2×1]. The input vector comprises 25 randomly selected consecutive samples of the input data signal 506, with its center point aligned with the 2 points selected for the output vector. The two output vector points correspond to the data (FIG. 9) and clock (FIG. 8) signals of the desired response 507. Each of the 50 vector pairs makes a single pass, called an epoch, through the training algorithm 500. After 50 epochs, the data is randomly reselected, and the process repeats. After 60 data selection processes, the mean squared error is usually acceptable. In the event that the error is still too large, the neural network 250 can be reset and retrained, or the configuration can be modified by adding or subtracting artificial neurons 260. For the preferred embodiment as described herein, the neural network 250 converges consistently.

Appendix A3 is the MATLAB implementation for selecting a random input data signal 506 and desired response 507 pair from the training set 505.

Appendix A4 depicts the weight initialization file in which the weight vectors $W_k$ 257 for each layer, represented by the variables w1, w2, and w3, are initialized with small random values. Appendix A4 corresponds to algorithm Step 1 521 in FIG. 7A. Appendix A5 is the MATLAB implementation for loading the network configuration and parameters into the MATLAB environment.

The implementation of the backpropagation training 510 of the neural network 250 is depicted in Appendix A6–A7. In lines 38–39 of Appendix A6–A7, random noise is added to the input data signal 506, X_n, for use in training the neural network 250. Lines 45–47 of Appendix A6–A7 correspond to backpropagation algorithm Step 2 522 in FIG. 7A in which the output response $O_k$ 261 for each artificial neuron 260 is calculated. Lines 48–49 of Appendix A6–A7 correspond to backpropagation algorithm Step 3 523 in FIG. 7A, wherein the error is calculated. Lines 50–63 in Appendix A6–A7 correspond to backpropagation algorithm Step 4 524 in FIG. 7B, wherein the backpropagation actually occurs and the weights 257 are adjusted.

Appendix A9 depicts the implementation of the test simulation and calculation of the mean square error per epoch. The test simulation program is used after the neural network 250 has been trained via the backpropagation algorithm 510 of FIG. 7A and 7B and its implementation in Appendix A6–A7. With the network configuration parameters set in Appendix A1, the neural network 250 of the preferred embodiment converged, as illustrated by the decreasing mean square error depicted in FIG. 13.

Figure 8:
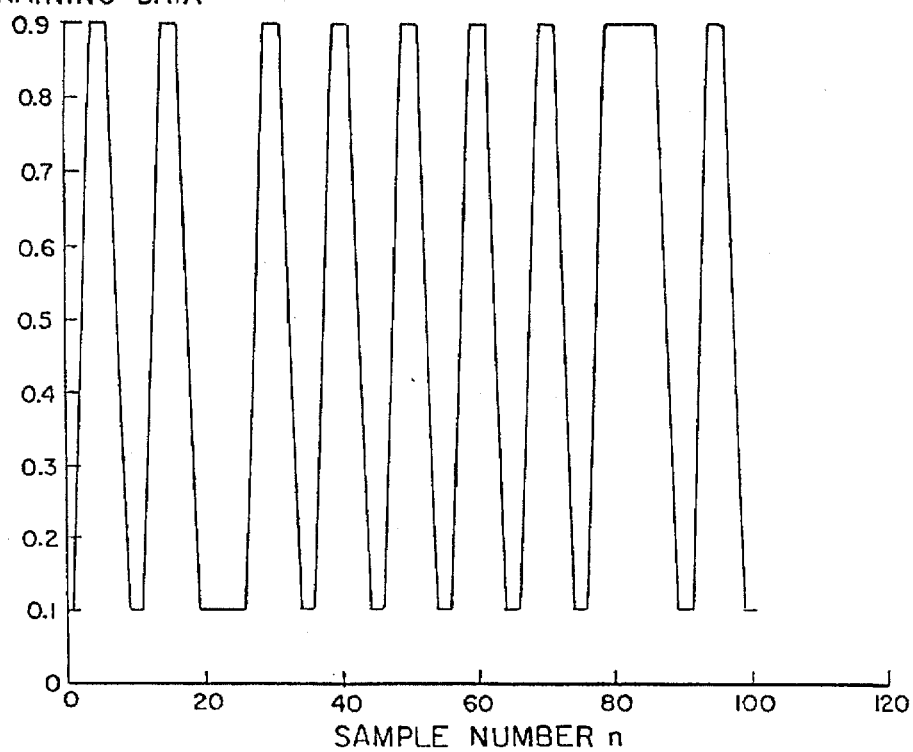
FIG. 8 is a plot of the training data output per sample number n.
Figure 9:
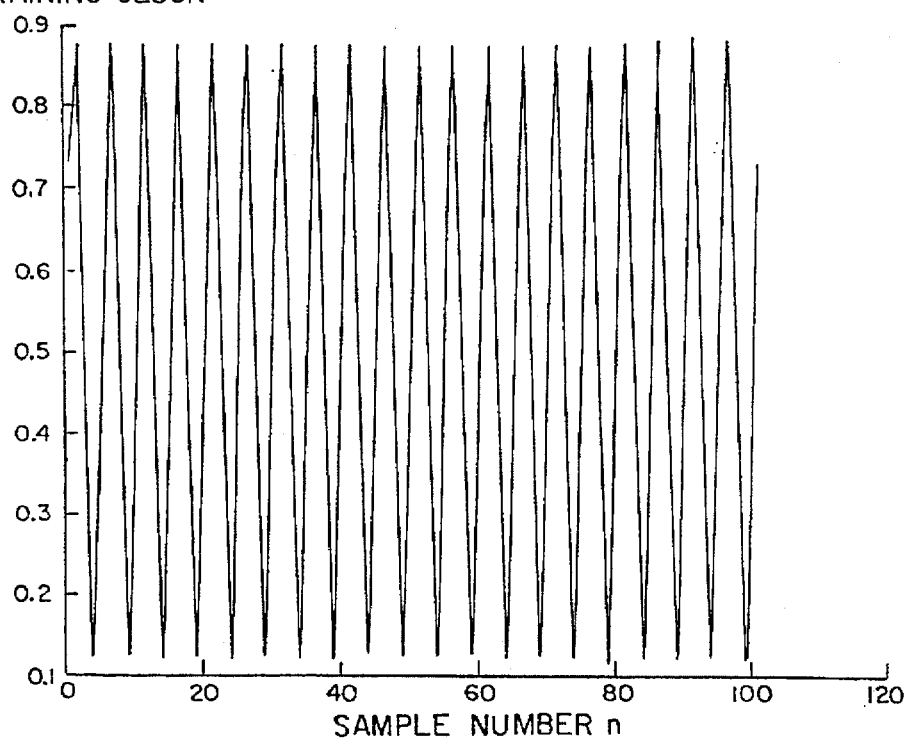
FIG. 9 is a plot of the training clock output per sample number n.
Figure 10:
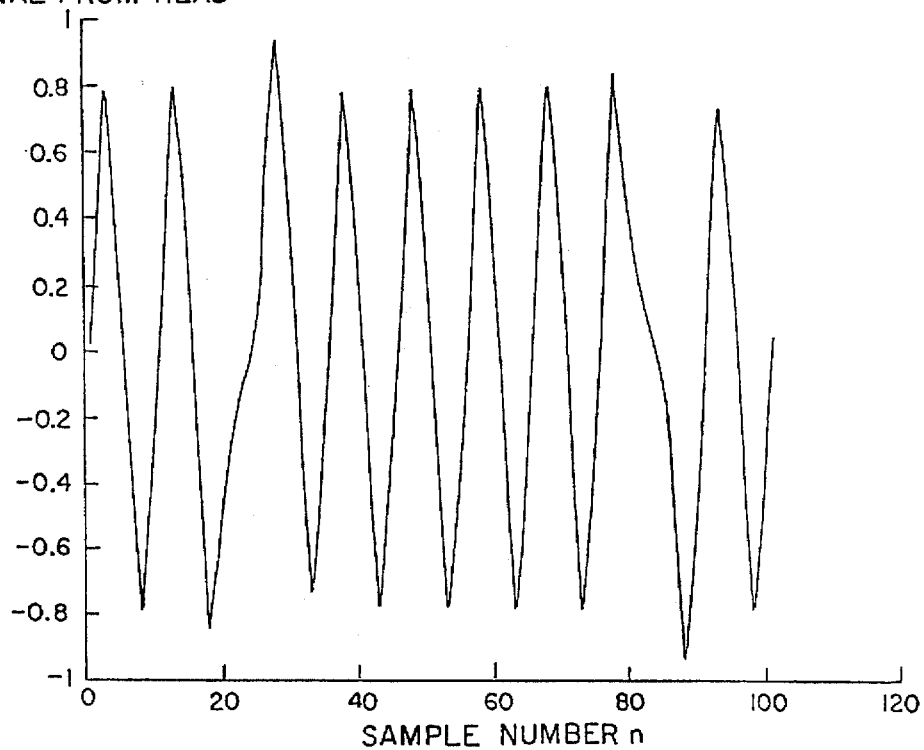
FIG. 10 is a plot of the signal from the head, or input data set, per sample number n.
Figure 13:
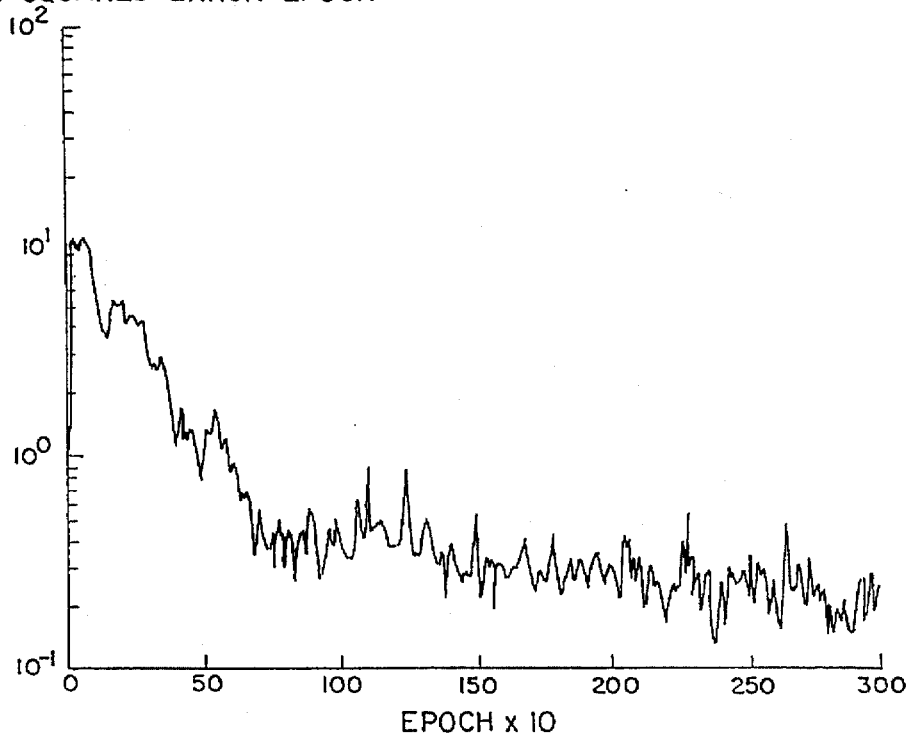
FIG. 13 is a graph of the mean square error per epoch achieved in the preferred embodiment.

FIG. 8 and 9 show plots of the training data and training clock, corresponding to the desired response 507 in FIG. 6, used for training the artificial neural network in the preferred embodiment. FIG. 10 shows a plot of the signal from the magnetic read head used as the input data set for the artificial neural network after it has been trained. FIG. 11 and 12 show plots of the reconstructed data (295) and clock (296) in the preferred embodiment. Finally, FIG. 13 shows a plot of the mean squared error achieved in the preferred embodiment.

Backpropagation 510 employed as the training method 500 for a feedforward neural network topology was the subject of the preferred embodiment. However, as known by those skilled in the art, neural networks 250 may be built using many different configurations and training algorithms 500. For example, the feedforward neural network of the preferred embodiment need not be fully interconnected. FIG. 5 illustrates an alternative preferred embodiment neural network configuration 290 in which the synchronization signal 296 is reconstructed from a sparsely connected neural network. Additionally, the number of layers and number of artificial neurons 260 per layer may be varied (although it is generally accepted that any pattern recognition or classification problem can be solved using only three layers). Furthermore, the feedforward network topology may be replaced with an unsupervised Hopfield network or a Hamming network; alternatively, it may be replaced with an unsupervised Kohonen self-organizing feature map.

Likewise, the algorithm 500 used in training the neural network is by no means limited to backpropagation 510. Many other methods for training neural networks 250 exist, including the perceptron convergence procedure and the LMS (Least Means Square) algorithm (and many variations thereon). The algorithm chosen to train the neural network 250 most often depends on the structure and configuration of the neural network 250. For example, both the Hopfield network and the Hamming network utilize training algorithms 500 specific to their networks. Thus, it will be appreciated that the nature and spirit of the invention is to utilize a neural network to replace the detection, equalization, and reconstruction stages of a traditional magnetic read channel 100, which encompasses various means for building and training a neural network 250.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

APPENDIX A1

BPN_PARA.M

```
r = 7;
s = 3;
m = 2;              % # of neurons initialization u1 = .1;
u2 = .25;
u3 = .4;            % learning rate ep_max = 50;        % maximum # of epochs mom = .95;          % momentum
```

Appendix A1 is the MATLAB network topology control parameter file used to simulate the artificial neural network portion of the read channel.

16

APPENDIX A2

GEN_DAT.M

```
a = ones(1,5);
b = -1*ones(1,5);
c = [-.4*sin(0:.4*pi:1.9*pi) + .5*ones(1,5)];

h = dibit(23000:200:27999)';   % channel impulse response from head data = [a,b,a,b,a,b,a,b,a,b,a,b,b,a,b,a,b,b,b,a,b,a,b,b,a,b,b,a,b,b,b,a,b,b,
a,b,b,a,b,b,b,a,b,b,b,a,b,a,b,b,b,a,b,b,a,b,b,a,b,a,b,a,b,a,b,a,b,a,b];
clk = [c,c,c,c,c,c,c,c,c,c,c,c,c,c,c,c,c,c,c,c,c,c,c,c,c,c,c,c,c,c,c,c,c,c,c,
c,c,c,c,c,c,c,c,c,c,c,c,c,c,c,c,c,c,c,c,c,c,c,c,c,c,c,c,c,c,c,c,c,c,c,c,c];

data = [data,-data];
clk = [clk,clk];

raw_data = conv(h,data);% convolve with raw data to get typical data data = conv(data,[1,2,1]);
[dar,dac] = size(data);
data = data(2:dac-1)/2.5*(max(data)));
data = data + .5*ones(size(data));      %data set padded 30 units on each
                                        %end to allow for settling.

D_n_set = [data;clk];

[hr,hc] = size(h);
[dr,dc] = size(D_n_set);

X_n_set = zeros(hc,dc + hc-1);

for 1 = 1:dc
        X_n_set(:,1) = raw_data(1:hc + 1-1)';
end

X_n_set = X_n_set(:,30:dc-30-1)/max(raw_data);
                        %the offset of +/-30 is to remove leader
                        %and trailer from the desired data set.
D_n_set = D_n_set(:,30:dc-30-1);
```

Appendix A2 is the MATLAB file used in simulation for generating desired response data and the input data vectors.

APPENDIX A3

N_DATA.M

```
Xt_n = zeros(size(X_n_set));
Dt_n = zeros(size(D_n_set));

[dr,dc] = size(D_n_set);    %get the new actual size of the data set for 1_2 = 1:50
  r_offset = round(dc*rand);
  if r_offset < 1
      r_offset = 1;
  end
  Xt_n(:,1_2) = X_n_set(:,r_offset);
  Dt_n(:,1_2) = D_n_set(:,r_offset);
end
X_n = Xt_n(:,1:50);              %resize the random pairs set of data
D_n = Dt_n(:,1:50);
```

Appendix A3 is the MATLAB file used in simulation for creating the test data vectors for input into the artificial neural network.

APPENDIX A4

BPN3INIT.M

```
%     function[w1,w2,w3] = bpn3init(r,u1,s,u2,m,u3,X_n)
%
%     INPUTS
%     r      first layer
%     s      second layer
%     m      output layer      # of neurons initialization
%
%     u1     first layer
%     u2     second layer
%     u3     output layer      learning rate
%
%     X_n    input vector
%
%     OUTPUTS
%     w1     first layer
%     w2     second layer
%     w3     output layer      random weights function[w1,w2,w3] = bpn3init(r,u1,s,u2,m,u3,ep_max,X_n)

[row,col] = size(X_n);           %get size of input data matrix

[w1] = rand(r,row)-rand(r,row);
w1 = u1*w1;                      %initialize weights first layer

[w2] = rand(s,r)-rand(s,r);
w2 = u2*w2;                      %initialize weights of second layer

[w3] = rand(m,s)-rand(m,s);
w3 = u3*w3;                      %initialize weights of output layer
```

Appendix A4 is the MATLAB file used in simulation for initializing the weights of each neuron of each layer.

APPENDIX A5

LOAD_NET.M

```
load c:\matlab\dibit\dibit.m      %load channel impulse response bpn_para                           %load net parameters gen_dat                            %generate master training data set n_data                             %select a new random subset

[w1,w2,w3] = bpn3init(r,u1,s,u2,m,u3,ep_max,X_n);    %initialize net delw3_o = zeros(size(w3));
delw2_o = zeros(size(w2));
delw1_o = zeros(size(w1));         %zero the momentum memory terms t_err = 1;                         %zero the error array
```

Appendix A5 is the MATLAB file for loading the network configuration and parameters into the MATLAB environment.

APPENDIX A6

BPN_RND.M

```
%
[w1,delw1_o,w2,delw2_o,w3,delw3_o,mse] = bpn_rnd(w1,delw1_o,w2,
delw2_o,w3,delw3_o,u3,ep_max,X_n,D_n,mom)
%
%       INPUTS
%       u1
%       u2
%       u3                  learning rate
%
%       w1
%       w2
%       w3                  input seight set,
%                           random or previously trained
%       delw1_o
%       delw2_o             previous weight correction
%       delw3_o             zero or previously trained
%
%       ep_max              maximum # of epochs
%
%       X_n                 input vector
%       D_n                 target vector
%       mom                 momentum factor
%
%       OUTPUTS
%       w1      first layer
%       w2      second layer
%       w3      output layer weights after training
%
%       delw1_o
%       delw2_o
%       delw3_o             previous weight correction
%
%       mse                 sum squared error per epoch function[w1,delw1_o,w2,delw2_o,w3,delw3_o,mse] = bpn_rnd(w1,delw
1_o,w2,delw2_o,w3,delw3_o,u3,ep_max,X_n,D_n,mom)

[row,col] = size(X_n);     %get size of input data matrix
mse = ones(1,ep_max);
                           %add a little random noise
X_n = 0.05*rand(size(X_n)) - .025*ones(size(X_n)) + X_n;
```

APPENDIX A7

```
for epoch = 1:ep_max

E_ep = 0;              %zero mse accumulator for n = 1:col          %for one epoch O1 = logsig(w1*X_n(:,n));
        O2 = logsig(w2*O1);    %calculate outputs for each layer
        O3 = logsig(w3*O2);

E = D_n(:,n)-O3;       %compute error
        E_ep = E_ep + sumsqr(E);   %compute error for each epoch r3_n = E.*(1-O3).*O3; %back propagate
        r2_n = (1-O2).*O2.*(w3'*r3_n);
        r1_n = (1-O1).*O1.*(w2'*r2_n);
                               %weight adjustments
        delw3_n = (u3*(r3_n*O2')) + mom*delw3_o;
        delw2_n = (u2*(r2_n*O1')) + mom*delw2_o;
        delw1_n = (u1*(r1_n*X_n(:,n)')) + mom*delw1_o;

delw3_o = delw3_n;    %save last value for next time
        delw2_o = delw2_n;
        delw1_o = delw1_n;

w3 = w3 + delw3_n*(1-mom);    %update weights
        w2 = w2 + delw2_n*(1-mom);
        w1 = w1 + delw1_n*(1-mom);

end mse(:,epoch) = E_ep;              %total mse per epoch end
```

Appendix A6-A7 is the MATLAB file implementing the backpropogation training algorithm.

APPENDIX A8

LOOPER.M

```
for looper1 = 1:60
   n_data

[w1,delw1_o,w2,delw2_o,w3,delw3_o,mse]=bpn_rnd(w1,delw1_o,w2,
delw2_o,w3,delw3_o,u3,ep_max,X_n,D_n,mom);
   t_err=[t_err,mse];
end
semilogy(t_err);              %plot the error
```

Appendix A8 is the MATLAB file which calls the training algorithm with 60 different random subsets of the data.

APPENDIX A9

BPN_TEST.M

```
% needs weight set, also needs data loaded

[row,col] = size(X_n);

for k = 1:col
   O1 = logsig(w1*X_n(:,k));
   O2 = logsig(w2*O1);
   O3 = logsig(w3*O2);

E = D_n(:,k)-O3;           % compute error vector
   out(:,k)=O3;
   raw_err(:,k)=E;            % store raw error
   err(:,k) = sumsqr(E);      % store and compute squared error
end
```

Appendix A9 is the MATLAB file used for testing the generalized artificial neural network and generating the mean square error data for the test set.

What is claimed is:

1. A magnetic read channel comprising:

a magnetic read head for converting a recorded magnetic signal to an electronic signal;

a preamplifier for receiving and amplifying said electronic signal to produce an amplified electronic signal;

delaying and storing means for receiving said amplified electronic signal, delaying successive representations of the received signal, and storing the delayed signal representations;

an artificial neural network for receiving as input said delayed signal representations, classifying said input, and producing, based on said delayed signal representations, at least one reconstructed data signal and at least one reconstructed synchronization signal;

wherein said artificial neural network is trained via training means which train said artificial neural network utilizing known input data and corresponding pairs of training data and clock synchronization signals.

2. The magnetic read channel of claim 1, said artificial neural network comprising a plurality of neurons each having:

neuron input means for receiving a plurality of inputs, weight assignment means for assigning weights to each of said plurality of inputs, neuron computational means for performing simple computations, and neuron output means for producing at least one output signal.

3. The magnetic read channel of claim 2, said plurality of neurons each further comprising:

output error computational means for receiving an output signal produced by said neuron output means and a desired response signal, and computing an output error signal.

4. The magnetic read channel of claim 2, said plurality of neurons being arranged in a feedforward network topology having a set of input layer neurons, at least one set of hidden layer neurons, and a set of output layer neurons, wherein the neuron output means of at least one of the neurons in a given layer connects to the neuron input means of at least one of the neurons in the immediately subsequent layer.

5. The magnetic read channel of claim 2, being fully interconnected, wherein:

each stored delayed successive signal representation is coupled to said neuron input means of each input layer neuron;

each neuron output means from each of said input layer neurons is coupled to the neuron input means of each hidden layer neuron in the immediately subsequent hidden layer;

each neuron output means from each of said hidden layer neurons is coupled to the neuron input means of each hidden layer neuron in the immediately subsequent hidden layer, if said immediately subsequent hidden layer exists;

each neuron output means from each hidden layer neuron of the hidden layer immediately prior to the output layer is coupled to the neuron input means of each output layer neuron;

the neuron output means of at least one of said output layer neurons represents a final reconstructed data signal; and the neuron output means of at least one of said output layer neurons represents a final reconstructed synchronization signal.

6. The magnetic read channel of claim 2, being sparsely connected, wherein:

each stored delayed successive signal representation is coupled to said neuron input means of each input layer neuron;

the neuron output means from at least one of said input layer neurons is coupled to the neuron input means of at least one hidden layer neuron in the immediately subsequent hidden layer;

the neuron output means from at least one of said hidden layer neurons is coupled to the neuron input means of at least one hidden layer neuron in the immediately subsequent hidden layer, if said immediately subsequent hidden layer exists;

the neuron output means from at least one hidden layer neuron of the hidden layer immediately prior to the output layer is coupled to the neuron input means of at least one output layer neuron;

the neuron output means of at least one of said output layer neurons represents a final reconstructed data signal; and the neuron output means of at least one of said output layer neurons represents a final reconstructed synchronization signal.

7. The magnetic read channel of claim 1, said delaying and storing means comprising a delay line having a plurality of delay line taps, wherein each of said delay line taps contains a single representation of said amplified electronic signal.

8. The magnetic read channel of claim 1, said training means for training said artificial neural network comprising test data generation means and a training algorithm.

9. The magnetic read channel of claim 8, said training algorithm comprising backpropagation.

10. A magnetic read channel comprising:

a magnetic read head for converting a recorded magnetic signal to an electronic signal;

a preamplifier for receiving and amplifying said electronic signal to produce an amplified electronic signal;

delaying and storing means for receiving said amplified electronic signal to produce stored delayed successive signal representations;

an artificial neural network for receiving, detecting, filtering and reconstructing said stored delayed successive signal representations to produce at least one reconstructed data signal and at least one reconstructed synchronization signal, said artificial neural network comprising a plurality of neurons each comprising neuron input means for receiving a plurality of inputs, weight assignment means for assigning weights to each of said plurality of inputs, neuron computational means for performing simple computations, and neuron output means for producing at least one output signal, and said artificial neural network being interconnected wherein each stored delayed successive signal representation is coupled to the neuron input means of each input layer neuron, each neuron output means from at least a portion of said input layer neurons is coupled to at least a portion of the neuron input means of each hidden layer neuron in the immediately subsequent hidden layer, each neuron output means from at least a portion of said hidden layer neurons is coupled to the neuron input means of at least a portion of the hidden layer neurons in the immediately subsequent hidden layer if said immediately subsequent hidden layer exists, each neuron output means from at least a portion of the hidden layer neurons of the hidden layer immediately prior to the output layer is coupled to the neuron input means of at least a portion of the output layer neurons, and the neuron output means of at least one of said output layer neurons represents a final reconstructed data signal and at least one of said output layer neurons represents a final synchronization signal; and wherein said artificial neural network is trained via training means comprising test data generation means to generate known input data and corresponding pairs of training data and clock synchronization signals and a training algorithm comprising backpropagation.

* * * * *